United States Patent [19]

Rademacher

[11] Patent Number: 5,497,549
[45] Date of Patent: Mar. 12, 1996

[54] PROCESS FOR THE PRODUCTION OF WINDING CORE ROLLS

[75] Inventor: Horst Rademacher, Ostercappeln, Germany

[73] Assignee: Felix Schoeller jr. Foto- und Spezialpapiere GmbH & Co. KG, Osnabruck, Germany

[21] Appl. No.: 242,533

[22] Filed: May 13, 1994

[51] Int. Cl.6 .................................................. B23P 11/02
[52] U.S. Cl. .......................... 29/895.21; 29/448; 29/450; 29/895.23; 156/156
[58] Field of Search ................ 156/156, 86; 29/895.1, 29/895.212, 895.23, 448, 449, 450, 453, 895.21; 492/56; 206/389

[56] References Cited

U.S. PATENT DOCUMENTS

| | | | |
|---|---|---|---|
| 1,608,206 | 11/1926 | Freedlander | 492/56 |
| 2,783,819 | 3/1957 | Duff | 29/450 |
| 3,070,281 | 12/1962 | Durkin et al. | 206/389 X |
| 3,611,536 | 10/1971 | Guenther et al. | 29/450 X |
| 3,714,693 | 2/1973 | Peterson | 492/56 X |
| 3,846,901 | 11/1974 | Lovett | 29/450 |
| 4,089,265 | 5/1978 | White et al. | 101/375 |
| 4,573,251 | 3/1986 | Hillyard | 29/450 |
| 5,072,504 | 12/1991 | Thompson | 29/895.23 X |

FOREIGN PATENT DOCUMENTS

| | | |
|---|---|---|
| 644166 | 4/1937 | Germany . |
| 645917 | 6/1937 | Germany . |

Primary Examiner—Michael W. Ball
Assistant Examiner—David W. Reed
Attorney, Agent, or Firm—Lockwood, Alex, Fitzgibbon & Cummings

[57] ABSTRACT

A process for the production of core rolls for the winding of sheet materials, and particularly of photographic base papers, includes a deformable rubber tube which is inserted into a mounting tube and inflated therein through a core casing. The core casing is then slid into the inflated rubber tube and the rubber tube is deflated, and by residual stress the rubber tube exerts a pressure on the exterior surface of the core casing and adheres firmly to it.

16 Claims, 1 Drawing Sheet

PROCESS FOR THE PRODUCTION OF WINDING CORE ROLLS

BACKGROUND, SUMMARY AND DESCRIPTION OF THE INVENTION

This invention relates to a process for the production of core rolls for the winding of sheet materials, and more particularly for the roll up of base papers for photographic layers.

In general such winding core rolls are formed of paper or cardboard, as well as plastic, metal or wood. The following requirements are placed on core rolls for the rolling up of sheet materials like papers or foils:

The core roll should not sag as the result of the weight of the sheet materials.

The cross-section of the core roll should not deform during the roll up or roll off process.

The core roll should have a definite moistness and, if applicable, contain a moisture barrier of metal to prevent the exchange of moisture between the core and the paper.

The core roll should be abrasion proof, that is the surface of the core roll should not be damaged upon fixing the sheet material to it with an adhesive band or the subsequent removal of the band.

The surface of the core roll should be uniform and have no markings.

The core roll should only be subject to static charges to a limited extent to avoid undesirable contamination of the sheet material by dust particles which are attracted by the core roll.

In the event that the sheet material is a photographic base paper, the coating of the core roll should be photochemically compatible.

A high radial pressure prevails within the core roll due to a certain intensity of winding. This pressure leads to the pressing of irregularities onto the sheet of material which is to be rolled on the core roll, such as the edge of the sheet, as well as by the adhesive band which is used for the fixing of the sheet. As the result, clearly visible and undesirable markings occur which are visible on the last 20 to 40 meters of the paper sheet. This material is considered to be waste material.

Attempts have been made to counteract the problem of the impressions and markings through the production of specially hard, smooth core rolls. As the result, the markings which occur due to the irregularities in the core roll surface are avoidable. However, the markings which arise due to the edge of the sheet and the fixing of the sheet can not be avoided.

One other attempt to solve this problem is described in German DE-OS 36 10 557. It discloses core rolls which are coated with a deformable, primarily foamed material. The undesirable markings and the resulting waste can be reduced by that means to approximately 5 to 10 meters. A disadvantage of these core rolls is that they can only be disposed of with difficulty and their manufacture is more expensive because of their compound character.

The materials which have been used up to this point for the coating of the core rolls in the form of a tube, band or foil, are fixed with the help of an adhesive to the surface of the core roll. In the alternative they can be applied by extrusion or foaming. This type of coating and its fixation to the surface of the core roll is expensive and makes the disposal of the core rolls more difficult.

German patent DE-PS 644 166 describes the drawing or positioning of elastic tubes by means of suction or pressure on the rolls. In accordance with one form of implementation, the elastic tube is drawn onto the roll a short distance by hand, and on the other end it is sealed through drawing by hand onto a mouthpiece which is connected with a compressed air pump. The tube is then pumped up and drawn in the pumped up condition over the roll. The presupposition for this procedure is a certain inherent stability, that is to say, a certain thickness of the tube, because damage can otherwise occur. In accordance with a second implementation, an underpressure is produced between a hollow body and the elastic tube which is introduced into it, and the latter is consequently held by suction to the internal wall of a mounting pipe. The widening and fixing of the tube by means of underpressure requires a high expenditure in sealing between the tube and the mounting pipe. Moreover, there is a disadvantage that the object which is to be drawn over can now no longer be inserted into the hollow body in a sliding manner on an air cushion. Any abutting of the roll on the rubber tube can lead to damage, so this procedure cannot be recommended.

In accordance with German DE-PS 645 917, a tube which is outside of a hollow body, but which is attached to it, is inflated, and the object which is to be covered with the tube is inserted into the expanded tube. The disadvantage in this procedure is that the tube is not fixed in the hollow body. Like the implementations described above, this procedure can only be carried out with tubes that have a certain wall thickness.

It is thus the task of the present invention to provide a process for the production of core rolls for the rolling up of sheet materials in which the core rolls cause no undesirable markings on the sheet materials. Thus, the usual waste is reduced to a minimum and the product can be produced in a manner free of problems. The process of the invention is particularly well suited for the rolling up of base papers for photographic layers.

A rubber tube is applied against the internal wall of a mounting pipe by inflation with compressed air or a similar pressure agent at a pressure of about 0.2 to 0.5 bar. The mounting pipe with the rubber tube is then slid onto the core casing and, after the pressure is reduced, it is applied tightly against the core casing, whereby the rubber tube is held in an unmovable manner by a pressure which is exerted by the rubber tube against the surface of the core casing. After the application of the rubber tube, the projecting ends of the tube are cut off, preferably with a heated blade, and the edges are consequently protected against tears.

The core casing which is used for the production of the core rolls in accordance with the invention is preferably a paperboard casing, the surface of which can be unprocessed.

The ratio of the internal diameter of the rubber tube to the external diameter of the core casing is preferably about 0.70:1 to 0.95:1. The thickness of the rubber tube may vary in range from about 0.5 to 5 mm, and preferably 1 to 3 mm. The material of the rubber tube is a rubber with a hardness of from about 20 to 50 shore, and preferably 30 to 45 shore. In one special embodiment of the invention, the rubber material is an acid resistant rubber which contains a softening agent.

Surprisingly, the core rolls which are produced in accordance with the present invention have been found to reduce the accumulation of material waste, which at the present time is approximately 40 meters per roll in the case of paper, to less than 5 meters. In addition to the waste reduction, this small amount of waste has the advantage that it may be left on the core roll and its quantity is sufficient to protect the rubber surface of the core roll and provides security in transport. After the core roll has been freed of the remaining small amount of paper waste and cleaned, it can be used again. Moreover, the paperboard casing which is used as a core casing does not require any moisture barrier of folded aluminum foil. In view of this it can be recycled free of any problems.

Because the rubber coating tube only adheres to the surface of the core casing by its residual stress, no compound material is brought about. In the event of a defect in the casing, the rubber tube can be separated from the core casing in the simplest manner, for example by a blade cut, and both materials can be recycled again as work materials.

The adhesive band which is used for fixing of the edge of the paper sheet to the core roll can be removed from the rubber surface without any surface damage to the core roll.

BRIEF DESCRIPTION OF THE DRAWING

Reference will be made to follow to the attached drawing in which.

DESCRIPTION OF THE PREFERRED EMBODIMENT

A core casing 6 comprising paperboard should support a uniform sheathing in the form of a rubber tube 1. This can be of different thicknesses, just as the core casing 6 can also be of different lengths and diameters.

Figure 1:
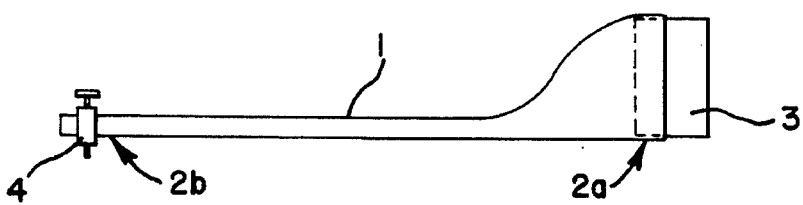
FIGS. 1–5 depict the stepwise production process of the core roll in accordance with the present invention.
Figure 2:
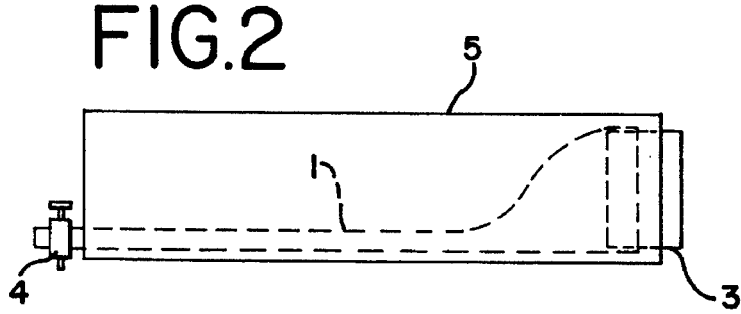
Figure 3:
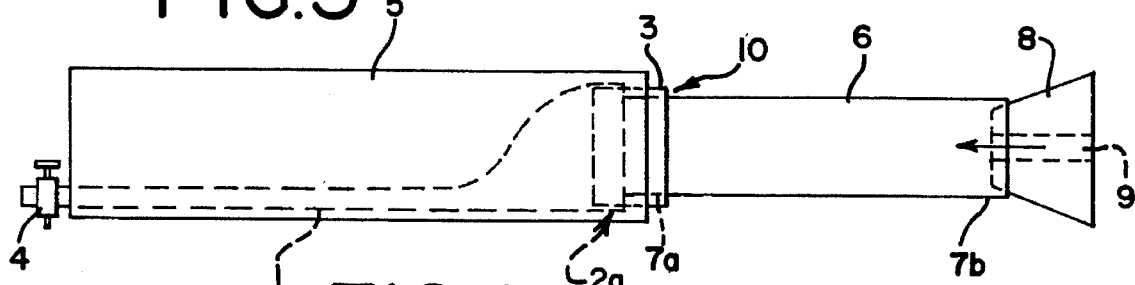

To begin the preferred process a rubber tube 1 of a certain length and wall thickness is selected. As shown in FIG. 1, its end 2a is drawn onto a short guide casing 3, and its other end 2b is shut off by a clamp 4. As shown in FIG. 2, this structure of rubber tube 1 and short guide casing 3 is introduced into a mounting pipe 5. As shown in FIG. 3, the guide casing 3 together with the end 2a of the rubber tube 1 which is positioned thereon, is placed onto one end 7a of the core casing 6, and the other end 7b of the core casing is sealed by means of a plug 8. The plug 8 has a bore 9 to which a compressed air pipe (not shown) is connected.

Figure 4:
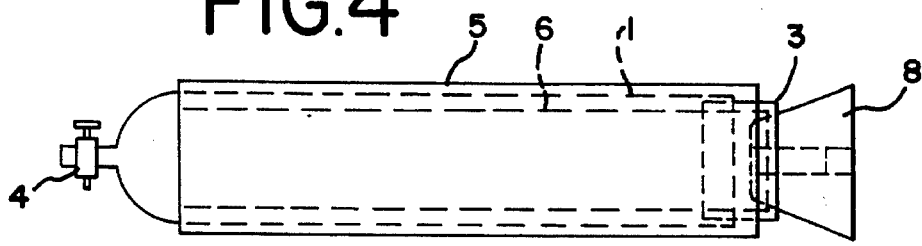

The internal diameter of the mounting pipe 5 is dimensioned such that the guide casing 3 and the end 2a of the rubber tube 1 which is positioned on it can be moved therein with good clearance. The internal diameter of the guide casing 3 is also dimensioned such that the end 7a of the core casing 6 which is inserted therein has a certain clearance in the form of an annular aperture 10 and, thus, it does not seal tightly. When air under pressure is forced through the bore 9 and into the core casing 6 and the rubber tube 1, the tube 1 swells until it is applied snugly against the internal surface of the mounting pipe 5. The core casing 6 can now be slid through the guide casing 3 into the rubber tube 1, as shown in FIG. 4, without difficulty and without the application of force. The air escaping through the narrow annular aperture 10 between the guide casing 3 and the core casing 6 thereby essentially serves as a cushion, so that friction is not present between the internal surface of the guide casing 3 and the external surface of the core casing 6, and the core casing occupies the position which is depicted in FIG. 4.

Figure 5:
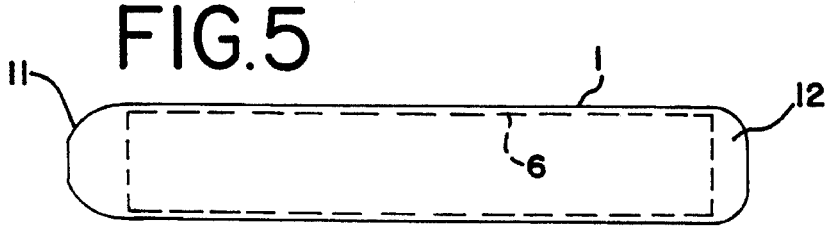

The compressed air is now disconnected and the clamp 4 is removed. The rubber tube 1 separates from the internal surface of the mounting pipe 5 and attempts to resume its original dimension. Thereby, it becomes applied solidly around the external surface of the core casing 6 exerting an adjustable contact pressure. After the detachment of the clamp 4 and the removal of the guide casing 3 and the plug 8, the core casing 6 of paperboard with the rubber tube 1 which is now positioned on it is depicted in FIG. 5.

Figure 6:
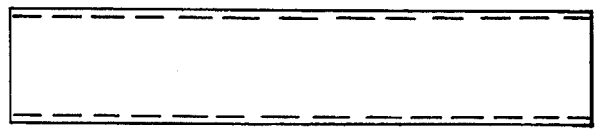
FIG. 6 depicts a completed core roll for the rolling up of sheet materials.

The projecting ends 11 and 12 of the rubber tube 1 are now cut off, preferably by a hot blade, and the winding core roll in accordance with the invention is thereby completed. It then has the form which is depicted in FIG. 6.

I claim:

1. A process for the production of a core roll for the winding of sheet material and in which the core roll includes a core casing with an external coating of an elastically deformable material thereon, comprising:

positioning a tube of the elastically deformable material which is to externally coat the core casing on one end of a guide casing and blocking off the other end of the deformable tube;

positioning the guide casing on a core casing so as to define a narrow annular aperture between said guide casing and core casing;

inserting said deformable tube and guide casing into a mounting tube and closing an end of the core casing with a plug having a bore;

introducing a pressurized fluid through the bore and said core casing into the deformable tube to deform the deformable tube so as to press the deformable tube against the internal wall of said mounting tube;

sliding said core casing into the deformed tube with at least some of said pressurized fluid passing through said annular aperture to define a fluid cushion between said guide casing and core casing; and relieving the pressure of the pressurized fluid to retract said deformable tube from the internal wall of the mounting tube and cause the deformable tube to adhere to the exterior surface of said core casing.

2. The process of claim 1, wherein said deformable tube is rubber.

3. The process of claim 2, wherein said core casing is paperboard.

4. The process of claim 1, wherein said core casing is paperboard.

5. The process of claim 1, wherein the thickness of said deformable tube is about 0.5–5.0 mm.

6. The process of claim 5, wherein the thickness of said deformable tube is about 1–3 mm.

7. The process of claim 3, wherein the thickness of said deformable tube is about 0.5–5.0 mm.

8. The process of claim 7, wherein the thickness of said deformable tube is about 1–3 mm.

9. The process of claim 1, wherein the hardness of said deformable tube is about 20–50 shore.

10. The process of claim 9, wherein the hardness of said deformable tube is about 30–45 shore.

11. The process of claim 3, wherein the hardness of said deformable tube is about 20–50 shore.

12. The process of claim 11, wherein the hardness of said deformable tube is about 30–45 shore.

13. The process of claim 8, wherein the hardness of said deformable tube is about 20–50 shore.

14. The process of claim 13, wherein the hardness of said deformable tube is about 30–45 shore.

15. The process of claim 1, wherein the ends of said deformable tube project beyond said core casing when said tube is adhered to the exterior surface of said core casing, and the projecting ends are cut off with a blade.

16. The process of claim 15, wherein said blade is hot.

* * * * *